Dec. 29, 1959  J. N. TERLECKY  2,918,747
FISHHOOK RELEASE IMPLEMENT
Filed June 10, 1957
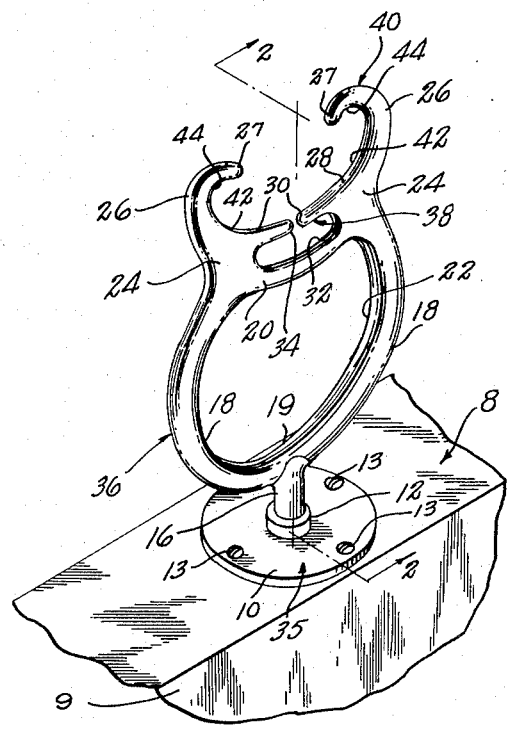
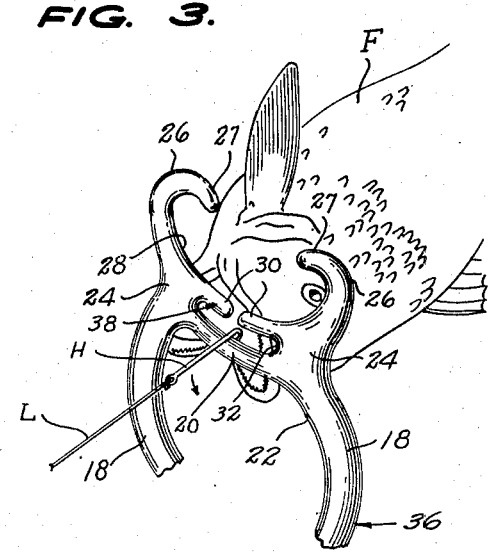
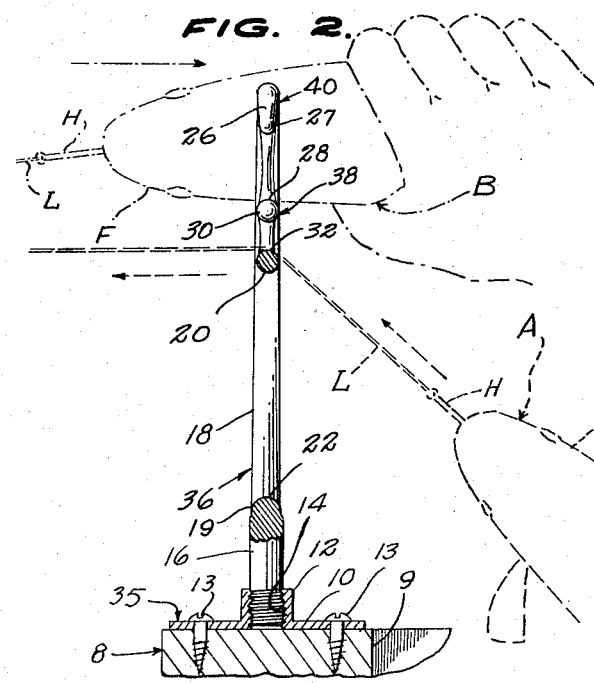
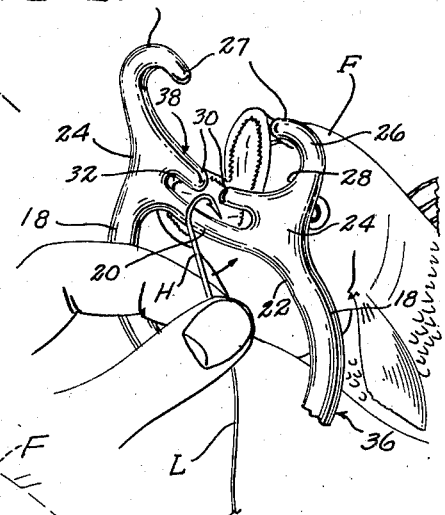
INVENTOR.
JOHN N. TERLECKY,
BY
Trachtman + Zoda
ATTORNEYS.

United States Patent Office 2,918,747
Patented Dec. 29, 1959

2,918,747

FISHHOOK RELEASE IMPLEMENT

John N. Terlecky, Trenton, N.J.

Application June 10, 1957, Serial No. 664,852

10 Claims. (Cl. 43—53.5)

This invention relates to devices for disengaging a fishhook from the mouth of a fish.

One object of the present invention is to provide a fishhook release implement which will comprise a unitary, wholly rigid assembly readily mountable upon a fish box or equivalent support in a stationary position, with said assembly being so designed as to permit a fishhook and line to be swiftly brought into operative position for removal of the hook.

Another object is to provide, in a fishhook release implement of the character stated, means designed to facilitate the swift disengagement of the hook from the mouth of the fish, regardless of the size of the fish and the location at which the hook is embedded.

A further object of the invention is to provide a fishhook release implement which will be so designed as to cause the fish to be brought up against the same, in proper position for removal of the fishhook, in such a way that ordinarily, it will not be necessary to grasp the fish.

Another object of importance is to provide, in a fishhook release implement, operational characteristics such as to insure to the maximum extent against the user's being bitten, "finned" or stung by the caught fish.

Other objects will appear from the following description, the claims appended thereto, and from the annexed drawings, in which like reference characters designate like parts throughout the several views, and wherein:

Figure 1 is a perspective view of a fishhook release implement according to the present invention, mounted in position upon a fish box only a fragment of which is shown;

Figure 2 is an enlarged sectional view substantially on line 2—2 of Figure 1, the chain-dotted and dash-dotted lines showing the fish in first and second positions, respectively;

Figure 3 is a fragmentary perspective view showing the device and the fish at a third position in the unhooking operation, with the fish being drawn up against the abutment means; and Figure 4 is a view like Figure 3 in which the hook has been rocked about the fulcrum means of the device to disengage the same from the fish, freeing the fish so that it will drop into the fish box.

Referring to the drawing in detail, designated generally at 8 is a fish box, of the type that is common equipment on fishing boats. The fish box (see Figure 2) has the usual upwardly opening storage or receiving space 9 which may or may not be provided with a lid.

This, of course, is a conventional part of the equipment of a fishing boat, and most usually, when a hook H, connected to a line or leader L, is to be disengaged from the mouth of a fish F, it is necessary that the fish be grasped or stepped on, while the hook is being worked loose. This is exceedingly difficult, and often results in the fisherman being bitten, or impaled by a fin. Still further, when the fish has been unhooked, it is often diffi- cult to grasp the same as it flops about in the bottom of the boat.

Both of these difficulties are obviated in accordance with the present invention, through the provision of a fishhook release implement adapted to be mounted upon the edge of a fish box 8, adjacent the storage space 9 so that the fish, when freed from the hook, will drop into said storage space automatically.

The device constituting the present invention includes a flat, circular base 10 having a center boss 12 formed with a threaded recess or opening 14 which extends normal to the plane of the base. The base is provided with a circumferential series of openings uniformly, angularly spaced about the margin of the base, and adapted to receive lag screws 13 or equivalent means employed for the purpose of fixedly connecting the base to the adjacent, supporting surface of the fish box 8 or other support.

A comparatively short, straight arm or post 16 has at one end threads complementing the threads of the recess 14, for threading of the post into the recess. Integral with the opposite end of the arm or post 16 is the bight portion of a generally U-shaped support that includes a pair of oppositely, outwardly bowed arms 18. The arms 18 are curved about a common center, and merge into a curved bight 19, that constitutes the portion of the support integral with the arm 16 as illustrated in Fig. 2 and is concentric to the arms 18.

At the ends of the arms remote from the bight 19, said arms are rigidly connected to the opposite ends of an elongated fulcrum member or fulcrum bar 20. This is approximately straight, and extends transversely of the arms, across the space between the arms. The fulcrum bar is integral with the arms in the illustrated example, and as a result, the fulcrum bar 20, the arms 18, and the bight 19 cooperate to define a large center opening 22 of the support, which center opening has a purpose to be made clear hereinafter.

The arms 18 and the fulcrum bar 20, at the connected ends thereof, are integral with wide, generally flat connecting portions 24 which are in turn integral with the proximal or inner ends of oppositely but identically formed, elongated guides or guide arms 26 that extend upwardly from the opening 22.

The guide arms 26, at their distal ends, are integrally formed with inwardly curving extensions 27, and as a result, the arms define between the same a wide guide space 28 opening at one end between the confronting, inwardly curving extensions 27.

Also integral with the connecting portions 24 are confronting, elongated fingers 30. These are in closely, laterally spaced relation to the fulcrum bar 32, and extend substantially parallel to the fulcrum bar. The fingers 30 are in end-to-end relation, with their proximal ends being integrally secured to the connecting portions 24. The distal ends of the fingers 30 are closely spaced apart, at a location medially between the opposite ends of the fulcrum bar.

The fingers 30 cooperate with the fulcrum bar in defining an aperture 32 which is elongated in a direction transversely of the device. Aperture 32 is substantially smaller than the opening 22, and is separated from the opening 22 by the fulcrum bar 20, the fulcrum bar bounding the opening 22 at one side thereof and also bounding the aperture 32.

The spacing of the distal ends of the fingers 30 defines an entranceway or passage 34, communicating between the aperture 32 and the guide space 28, at the end of the guide space remote from the entrance end of the same, said entrance end being defined between the distal ends of the guide arms 26.

By reason of the construction illustrated and described, it will be noted that the guide arms 26, at their lower ends, have rigid connections, through the medium of the connecting portions 24, with the respective, adjacent ends of support arms 18, the respective, opposite ends of fulcrum bar 32, and the respective proximal ends of the fingers 30.

It is also important to note that the device may be appropriately considered as comprising a plurality of rigidly connected main components. Thus, the arms 18 and the connecting bight 19 constitute one component, generally designated at 36 and constituting a support or support frame. The base 10 having the boss 12, together with the post 16, defines a second component, generally designated at 35 and comprising a base or mount for the support. The fingers 30 cooperate in constituting an abutment generally designated 38, which abutment is of elongated, though discontinuous formation, and which is in closely, laterally spaced, approximately parallel relation to the fulcrum member or bar 20. Still further, guides 26, having the inwardly curving extensions 27, constitute a guide means generally designated 40 and opening at one end of the device.

The guide space 28 is progressively reduced in width in a direction from its open or upper end, to its lower end, where said guide space is in communication with aperture 32 through the medium of passage 34. In this connection, the guide space has opposite side surfaces 42 which are smoothly faced and are oppositely sloped, along which a line L may travel, so as to guide said lines to and through the passage 34.

The surfaces 42, at their upper end portions, that is, the end portions thereof remote from the passage 34, merge into internal shoulders or overhanging stop surfaces 44 of the guide means 40, defined by the extensions 27. Therefore, if the liveliness of the fish is such that the fish tends to snap the line out of the guide space 28 before the line can move through the passage 34, said line will move into the recesses defined by the shoulders 44, so as to be thrown back into the space and prevent it from moving out of the guide space altogether.

Considering now the use of the device, assuming that the hooked fish F has been brought into the boat, and as usual is flopping or wriggling wildly at the end of the line L, one may merely flip the fish and line into the guide space 28. In other words, the line may be thrown into the space 28, so that initially, the fish F will be in the position designated at A in dash-dotted lines in Figure 2.

Alternatively, one may grasp the fish as shown in chain-dotted lines at B in Figure 2, and insert the fish and line between the guide arms 26, shifting the fish rearwardly, in the direction of the upper arrow in Figure 2, so that the fish will be shifted from the position B to the position A.

When the line moves into the space 28, it will engage one of the side surfaces 42, and will be led by the same into and through the passage 34, so as to fall into the aperture 32. The line will now be in the dash-dotted position shown at A in Figure 2, and one merely now pulls upon the line in the direction of the lower arrow in Figure 2, so as to draw the fish from the position A up to the fulcrum bar 32. The fish will now be disposed entirely to one side of the common plane of the support 36, guide means 40 and abutment 38, the fish being at the position shown in Figure 3. The shank of the hook H will now extend through the aperture 32, as shown in Figure 3, with the line and the hook shank being disposed at one side of the mentioned common plane, and the fish being disposed at the opposite side. The fish therefore cannot bite the user, even when the hook is grasped as in Figure 4. One's hand, in other words, during the unhooking operation, is disposed at one side of the plane of the previously mentioned components, while the fish F is disposed entirely at the opposite side.

The shank of the hook H, as shown in Figure 3, will extend transversely of the elongated fulcrum bar 20, with the fulcrum bar and the fingers 30 forming a centrally apertured stop against which the fish is engaged, said stop limiting the fish against forward movement beyond its Figure 3 position.

The user now merely rocks the hook H counterclockwise in Figures 3 and 4, from the Figure 3 to the Figure 4 position. As shown in Figure 4, the line-connected inner end of the hook shank is rocked into the large center opening 22 of the support 36, and the fish as a result is unhooked, and will drop into the storage space 9 of the fish box.

One is not limited to the rocking action. Instead, one may rapidly move the hook back and forth along the length of the fulcrum bar. One may, at the same time, rock the shank. Alternatively, either action may be employed independently of the other.

In every instance, the hook automatically turns about the axis of its shank, so that the curved portion projects downwardly. This is so because the weight of the fish, no matter how the hook is engaged in the fish's mouth, causes the hook to turn over and point downwardly.

The back and forth or the rocking movement, or the combination of both, taken with the tendency of the hook to turn over, usually effects swift dislodgment of the hook. If the hook still resists dislodgment, one can grasp the fish, forcing the hook rearwardly in its mouth to become completely dislodged.

Ordinarily, one can dislodge the hook without grasping the fish, but there may be instances in which it is necessary that the fish be held. The construction permits one to grasp the fish with minimum difficulty, since it can be brought up against the fulcrum bar and fingers 30.

The weight of the fish will, of course, tend to cause the same to pivot downwardly when the head of the fish is snubbed against the abutment means or stop. This downward swinging movement of the fish from its Figure 3 to its Figure 4 position, in concert with the oppositely directed pivotal movement of the hook from its Figure 3 to its Figure 4 position, causes the hook to hang in reverse position on the fish, that is, with its shank alongside the head of the fish, though at the opposite side of the device. The barbed end of the hook thus is swung out of the portion of the mouth in which it has been engaged, facilitating the unhooking of the fish.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

I claim:

1. In a device for disengaging a fishhook from a fish's mouth, an elongated fulcrum member about which may be rocked the shank of the hook; and an elongated abutment rigidly connected to said member, said abutment and member lying in closely spaced relation, forming a stop limiting the hooked fish against forward movement, the abutment and member defining therebetween an aperture for receiving a fishing line connected to said fishhook, said abutment comprising at least two spaced fingers, the space between the fingers extending over the full transverse dimension of the abutment and constituting a passage communicating with said aperture to permit movement of the line into the aperture.

2. In a device for disengaging from a fish's mouth a fishhook having a line connected thereto, an elongated fulcrum member about which may be rocked the shank of the hook; and an elongated abutment rigidly connected to said member, said abutment and member lying in closely spaced, approximately parallel relation in a common plane, forming a stop limiting the hooked fish against forward movement, the space between the abutment and member constituting a line-and-hook-receiving aperture and the abutment comprising a pair of longitudinally aligned, identical but opposite fingers spaced apart to define therebetween a passage extending through the abutment and communicating with said aperture for movement of the line and hook into and out of the aperture.

3. In a device for disengaging from a fish's mouth a fishhook having a line connected thereto, an elongated fulcrum member about which may be rocked the shank of the hook; and an elongated abutment rigidly connected to said member, said abutment and member lying in closely spaced, approximately parallel relation in a common plane forming a stop limiting the hooked fish against forward movement, the space between the abutment and member constituting a line-and-hook-receiving aperture centered in said stop, the abutment comprising a pair of fingers arranged in end-to-end spaced relation to form a passage therebetween communicating with said aperture for movement of the line and hook into and out of the aperture.

4. In a device for disengaging a fish hook from a fish's mouth, an elongated fulcrum bar about which may be rocked the shank of the hook; an elongated abutment having a rigid connection to the fulcrum bar and closely, laterally spaced from the fulcrum bar to form therewith a stop limiting the hooked fish against forward movement, the space between the bar and abutment constituting a line-receiving aperture in the stop, the abutment comprising a pair of fingers spaced apart to define between them a passage for said line, said passage communicating with the aperture; and a pair of spaced guide arms rigidly connected to the respective ends of the fulcrum bar and abutment, the fulcrum bar and abutment extending across the space between the guide arms and the guide arms being laterally spaced over their full lengths, defining therebetween a guide space leading to the fulcrum bar and abutment in communication with said passage for guiding the hook and fish thereto.

5. In a device for disengaging from a fish's mouth a fishhook having a line connected thereto, an elongated fulcrum bar about which may be rocked the shank of the hook; elongated fingers having proximal ends rigidly connected to the fulcrum bar, the fingers being arranged end-to-end in closely, laterally spaced relation to the fulcrum bar, forming with the fulcrum bar a stop limiting the hooked fish against forward movement, the space between the bar and fingers constituting a central aperture in the stop adapted to receive the line and hook, said fingers being spaced at their distal ends to form a passage communicating with said aperture, through which passage the line and hook are movable into and out of said aperture; a pair of spaced, elongated guide arms rigidly connected to the respective ends of the fulcrum bar and to the respective proximal ends of the fingers, the fulcrum bar and fingers extending across the space between the guide arms and the guide arms being laterally spaced over their full lengths to define therebetween a guide space leading to the stop for guiding the hook and fish thereto, said passage communicating between said aperture and guide space.

6. In a fishhook-disengaging device, a construction as in claim 5 wherein the guide arms have smoothly faced surfaces bounding the guide space at opposite sides thereof, said surfaces sloping downwardly toward and extending continuously to the opposite sides of the passage to constitute surfaces along which said line and hook are shiftable to the passage.

7. In a fishhook-disengaging device, a construction as in claim 5 wherein said guide arms, fingers, and fulcrum bar are disposed wholly in a common plane.

8. In a device for disengaging from a fish's mouth a fishhook having a line connected thereto, an elongated fulcrum bar about which may be rocked the shank of the hook; elongated fingers having proximal ends rigidly connected to the fulcrum bar, the fingers being arranged end-to-end in closely, laterally spaced relation to the fulcrum bar, forming with the fulcrum bar a stop limiting the hooked fish against forward movement, the space between the bar and fingers constituting a central aperture in the stop adapted to receive the line and hook, said fingers having distal ends closely spaced medially between the ends of the fulcrum bar to form a passage communicating with said aperture through which passage the line and hook are movable into and out of the aperture; a pair of elongated, spaced guide arms having proximal ends rigidly connected to the respective ends of the fulcrum bar and to the respective proximal ends of the fingers, the fulcrum bar and fingers extending across the space between the guide arms, the guide arms being laterally spaced over their full lengths with their distal ends spaced apart a distance greater than the distance between the distal ends of the fingers, defining between the guide arms a guide space open at one end and leading to the fulcrum bar and fingers for guiding the hook and fish thereto, said passage communicating between the aperture and the other end of the guide space.

9. In a fishhook-disengaging device, a construction as in claim 8 in which said guide arms have inwardly curving extensions on their distal ends forming abutments at opposite sides of the space between the distal ends of the guide arms, said abutments limiting the line against movement out of the guide space.

10. A device for disengaging from a fish's mouth a fishhook having a line connected thereto, comprising: an elongated fulcrum bar about which may be rocked the shank of the hook; an elongated abutment connected to the fulcrum bar in closely spaced, generally parallel relation thereto forming with the fulcrum bar a stop having a central, line-and-hook-receiving aperture and limiting the hooked fish against forward movement, said abutment comprising a pair of elongated fingers disposed in end-to-end relation and having proximal ends rigidly connected both to the arms of the support and to the respective ends of the fulcrum bar, said fingers having closely spaced distal ends forming between them a passage communicating with said aperture, for movement of the line and hook into and out of the aperture; and a stationary support carrying said fulcrum bar and abutment, said support including a pair of arms spaced apart a distance greater than the distance between the distal ends of the fingers, said arms being rigidly connected at corresponding ends thereof to the respective opposite ends of the fulcrum bar, forming with the fulcrum bar a center opening in the support larger than the aperture and separated by the fulcrum bar from the aperture, into which opening the hook may be rocked.

References Cited in the file of this patent
UNITED STATES PATENTS

| | | |
|---|---|---|
| Re. 21,375 | Tillinghast | Feb. 27, 1940 |
| 2,289,767 | Ford | July 14, 1942 |

FOREIGN PATENTS

| | | |
|---|---|---|
| 152,115 | Great Britain | June 30, 1953 |